United States Patent
Thebault et al.

(10) Patent No.: US 8,355,441 B2
(45) Date of Patent: Jan. 15, 2013

(54) METHOD AND APPARATUS FOR GENERATING MOTION COMPENSATED PICTURES

(75) Inventors: Cédric Thebault, Villingen-Schwenningen (DE); Carlos Correa, Villingen-Schwenningen (DE); Sébastien Weitbruch, Kappel (DE)

(73) Assignee: Thomson Licensing, Issy les Moulineaux (FR)

( * ) Notice: Subject to any disclaimer, the term of this patent is extended or adjusted under 35 U.S.C. 154(b) by 1464 days.

(21) Appl. No.: 11/791,294

(22) PCT Filed: Dec. 8, 2005

(86) PCT No.: PCT/EP2005/056614
§ 371 (c)(1),
(2), (4) Date: May 22, 2007

(87) PCT Pub. No.: WO2006/061421
PCT Pub. Date: Jun. 15, 2006

(65) Prior Publication Data
US 2008/0030613 A1 Feb. 7, 2008

(30) Foreign Application Priority Data
Dec. 9, 2004 (EP) .................... 04292937

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.16

(58) Field of Classification Search .................. None
See application file for complete search history.

(56) References Cited

U.S. PATENT DOCUMENTS

| 5,504,531 A | 4/1996 | Knee et al. |
| RE41,196 E * | 4/2010 | Selby .................. 375/240.16 |
| 2007/0297513 A1 * | 12/2007 | Biswas et al. ............ 375/240.16 |

FOREIGN PATENT DOCUMENTS

| JP | 8223536 A | 8/1996 |
| JP | 3022977 A | 1/2000 |
| WO | WO 02/056589 | 7/2002 |

OTHER PUBLICATIONS

S.S. Skrzypkowiak et al.: "Affine Motion Estimation Using a Neural Network" Proceedings of the International Conference on Image Processing, Washington, Oct. 23-26, 1995, vol. vol. 1, pp. 418-421.
M. Bierling et al: "Motion Compensating Field Interpolation Using a Hierarchically Structured Displacement Estimator", Signal Processing, Elsevier Science Publishers B.V. Amsterdam, NL, vol. 11, No. 4, 1986, pp. 387-404.
Search Report Dated Jul. 4, 2006.

* cited by examiner

*Primary Examiner* — Nhon Diep
(74) *Attorney, Agent, or Firm* — Robert D. Shedd; Jeffrey M. Navon

(57) ABSTRACT

The present invention relates to a new method for generating motion compensated picture by interpolating two consecutive source pictures without using motion estimator. For a given pixel to be interpolated, all displacements within a given search range between former and next frame are considered and for each displacement the displaced block difference is calculated. The pixel value is then equal to the sum of each averaged pixel pair within the search range weighted by a correlation coefficient function of the corresponding displaced block difference.

5 Claims, 2 Drawing Sheets

METHOD AND APPARATUS FOR GENERATING MOTION COMPENSATED PICTURES

Figure 1:
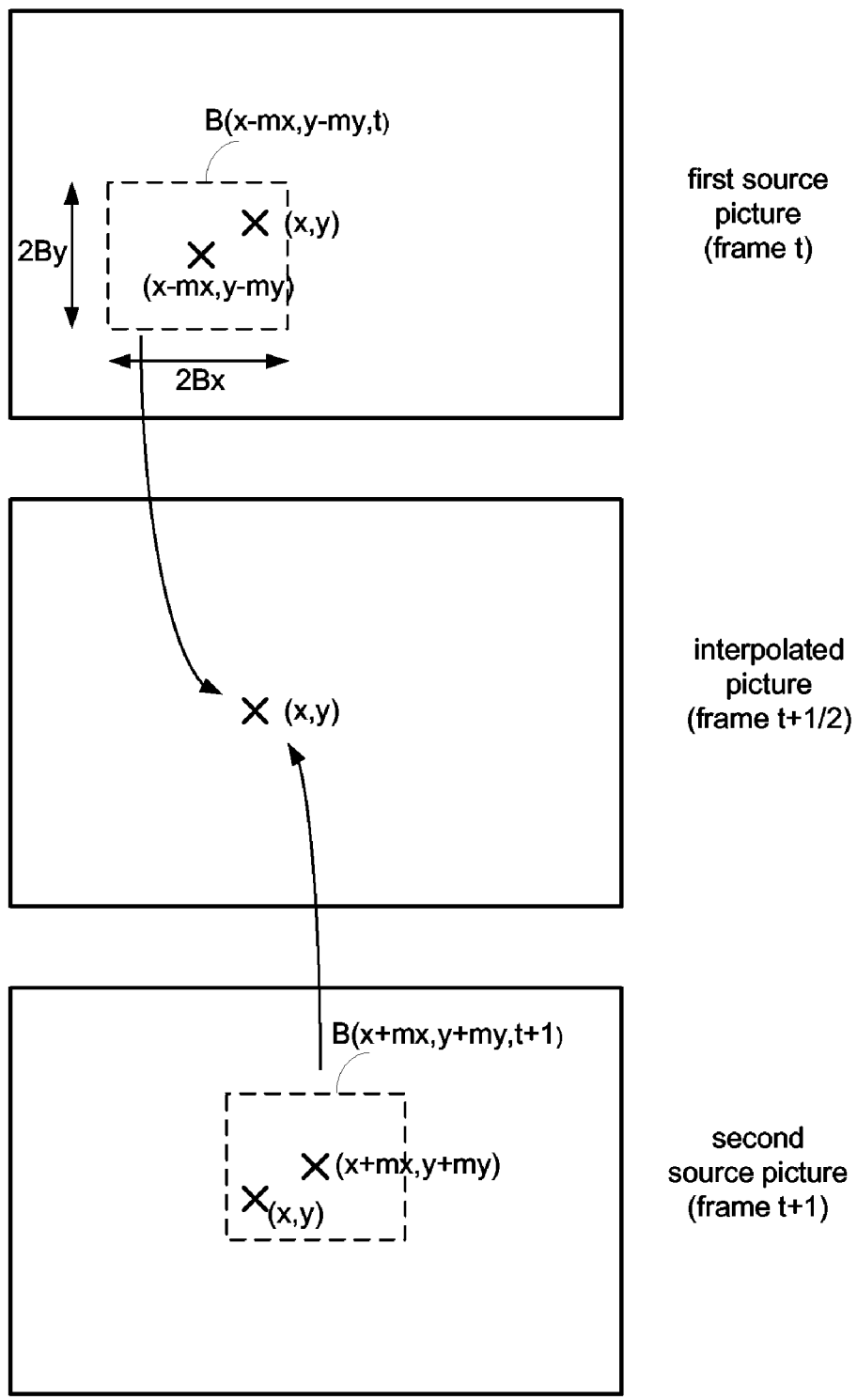

This application claims the benefit, under 35 U.S.C. §365 of International Application PCT/EP2005/056614, filed Dec. 8, 2005, which was published in accordance with PCT Article 21(2) on Jun. 15, 2006 in English and which claims the benefit of European patent application No. 04292937.2, filed Dec. 9, 2004.

The present invention relates to new method and apparatus for interpolating motion compensated picture from two consecutive source pictures.

BACKGROUND

It is known to generate interpolated pictures for converting a 50 Hz video signal into a 100 Hz video signal. These interpolated pictures should be motion compensated in order to not create visual artifacts.

Generally, a motion estimator is used for computing a motion vector for each pixel of a source picture in the 50 Hz signal. A motion vector represents the motion (represented by a pixel number) of a pixel between two consecutive source pictures. The motion vector of a pixel is then used for determining the position of this pixel in the interpolated picture.

The use of such a motion estimator is not satisfactory in some cases, notably when there is a zoom in or a zoom out between two consecutive source pictures. Some holes appear in the picture regions which are zoomed in and some conflicts appear in the regions which are zoomed out. A conflict designates the presence of two motion vectors imposing two different displacements for a given pixel. A hole designates the absence of motion vector for a given pixel.

INVENTION

The invention proposes a new method for interpolating motion compensated picture from two consecutive source pictures without using motion estimator.

The invention concerns a method for interpolating a motion compensated picture from two source pictures. It comprises the following steps for determining the pixel value of each pixel with coordinates (x,y) of the motion compensated picture:

for each motion value mx in a first range of motion values in the horizontal direction and each motion value my in a second range of motion values in the vertical direction, defining a pixel block in one of two source pictures, called first source picture, around the pixel with coordinates (x−mx,y−my) and a pixel block in the other source picture, called second source picture, around the pixel with coordinates (x+mx,y+my), computing a correlation coefficient for each couple of motion values (mx, my), this coefficient being representative of the correlation between the two pixel blocks defined for this couple of motion values (mx,my), allocating to the pixel with coordinates (x,y) of the motion compensated picture a value which is a function, for all couples of motion values (mx,my), of the arithmetic mean values of the pixel value of the pixels with coordinates (x−mx,y−my) in the first source picture and the pixels with coordinates (x+mx,y+my) in the second source picture and of the corresponding correlation coefficient.

In a particular embodiment, the value allocated to the pixel with coordinates (x,y) of the motion compensated picture is the average of the arithmetic mean values of the pixel value of the pixels with coordinates (x−mx,y−my) in the first source picture and the pixels with coordinates (x+mx,y+my) in the second source picture, said average being weighted by the corresponding correlation coefficient.

Advantageously, the inventive method comprises the following steps for computing the correlation coefficient for a couple of motion values (mx,my):

computing a block difference value between two pixel blocks associated to the considered couple of motion values (mx,my), and computing a correlation coefficient which is inversely proportional to said block difference value.

If each source picture comprises at least two color components, the block difference value is computed based on the video levels of said color components.

The invention concerns also an apparatus for interpolating a motion compensated picture from two source pictures. For determining the pixel value of each pixel with coordinates (x,y) of the motion compensated picture, it comprises:

a frame memory for storing one of the two source pictures, called first source picture, a first generator for computing, for each couple of motion values (mx, my), wherein the motion value mx belongs to a first range of motion values in the horizontal direction and the motion value my belongs to a second range of motion values in the vertical direction, a correlation coefficient representative of the correlation between a pixel block defined in the first source picture around the pixel with coordinates (x−mx,y−my) and a pixel block defined in the other source picture, called second source picture, around the pixel with coordinates (x+mx,y+my), a second generator for computing, for all couples of motion values (mx,my), the arithmetic mean values of the pixel value of the pixels with coordinates (x−mx,y−my) in the first source picture and the pixels with coordinates (x+mx,y+my) in the second source picture, and a fuzzy interpolation block for computing a value which is a function of the correlation coefficients computed by the first generator and the corresponding arithmetic mean values computed by the second generator.

In a particular embodiment, the fuzzy interpolation block computes the average of the arithmetic mean values computed by the second generator, each arithmetic mean value being weighted by the corresponding correlation coefficient computed by the first generator.

DRAWINGS

Exemplary embodiments of the invention are illustrated in the drawings and are explained in more detail in the following description.

Figure 2:
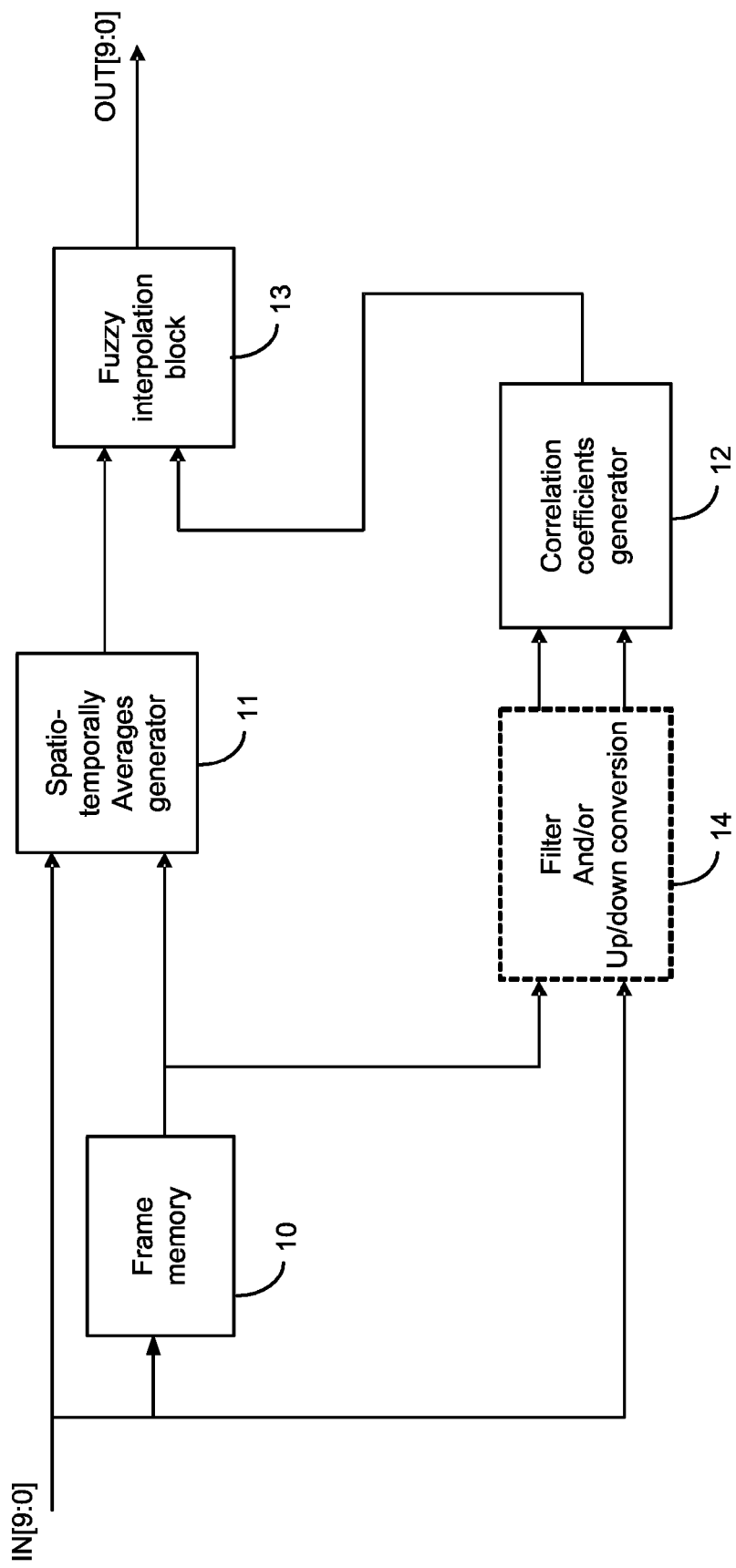

The FIG. 1 illustrates pixel blocks used in source pictures for defining a pixel value in the interpolated picture and the FIG. 2 shows the block diagram of a possible circuit implementation of the inventive method.

EXEMPLARY EMBODIMENTS

According to the invention, the method is computed pixel by pixel on the interpolated picture. At the beginning of the processing, no pixel value is known for this picture. These values are determined pixel by pixel sequentially. For example, the pixels of the first line are first individually determined, then the pixels of the second line and so on for the rest of the interpolated picture. Other scannings are possible but, whatever the scanning is, the pixel values are processed once and only once.

The interpolated picture (frame t+½) is generated from a current source picture (frame t), called first source picture, and the next one (frame t+1), called second source picture.

A motion range comprising motion values is defined for each spatial direction of the pictures. The motion values define the motion of the interpolated picture compared with the two source pictures. For example, in the horizontal direction, the motion value, called mx, is included in the range [−Mx,+Mx] and the motion value, called my, in the vertical direction is included in the range [−My,+My]. These ranges are chosen in accordance with the maximum possible motion (2*Mx in the horizontal direction and 2*My in the vertical direction) between two source pictures. These ranges are limited in order to limit the number of computations.

For each pixel with coordinates (x,y) in the interpolated picture and each motion values mx and my, a pixel block B(x−mx,y−my,t) is defined in the first source picture around the pixel with coordinates (x−mx,y−my) and a pixel block B(x+mx,y+my,t+1) is defined in the second source picture around the pixel with coordinates (x+mx,y+my). These two blocks B(x−mx,y−my,t) and B(x+mx,y+my,t+1) are spatiotemporally symmetric blocks with regard to the pixel (x,y) Different forms are possible for the blocks: it can be a horizontal segment, a rectangle, etc. . . . In the example of FIG. 1, the blocks are rectangles. The size of the blocks is 2Bx in the horizontal direction and 2By in the vertical direction. The block B(x−mx,y−my,t) includes all the pixels of the first source picture with coordinates (x+bx−mx,y+by−my) where bx and by correspond to all values included in [−Bx,+Bx]. In the same manner, the block B(x+mx,y+my,t+1) includes all the pixels of the second source picture with coordinates (x+bx+mx,y+by+my) where bx and by correspond to all values included in [−Bx, +Bx].

Then, for each pixel with coordinates (x,y) in the interpolated picture, block differences are computed between two spatiotemporally symmetric pixel blocks of the source pictures with exception on the borders of the picture. This computation is made for each motion values mx and my.

This computation is made for each color component Red, Green, Blue and the results are summed up.

For the motion values mx and my, the block difference could be defined by the following formula:

$$Diff(t, x, y, mx, my) =$$
$$\sum_{(bx,by)} (|\text{Red}(t, x+bx-mx, y+by-my) - \text{Red}(t+1, x+bx+mx,$$
$$y+by+my)| + |\text{Green}(t, x+bx-mx, y+by-my) -$$
$$\text{Green}(t+1, x+bx+mx, y+by+my)| +$$
$$|\text{Blue}(t, x+bx-mx, y+by-my) -$$
$$\text{Blue}(t+1, x+bx+mx, y+by+my)|)$$

Another possible value for this block difference could be:

$$Diff(t, x, y, mx, my) =$$
$$\text{MAX}(|\text{Red}(t, x+bx-mx, y+by-my) - \text{Red}(t+1, x+bx+mx,$$
$$y+by+my)|; |\text{Green}(t, x+bx-mx, y+by-my) -$$
$$\text{Green}(t+1, x+bx+mx, y+by+my)|;$$
$$|\text{Blue}(t, x+bx-mx, y+by-my) -$$
$$\text{Blue}(t+1, x+bx+mx, y+by+my)|)$$

From each block difference computed for the current pixel of the interpolated picture, a correlation coefficient is then computed. This coefficient, called C(mx,my), is representative of the correlation between the two symmetric pixel blocks. This coefficient is inversely proportional to the difference value. So, this coefficient is bigger for smaller difference and vice versa. For example, $$C(mx, my) = \left[ \max_{\substack{-Mx \le m'x \le Mx \\ -My \le m'y \le My}} Diff(t, x, y, m'x, m'y) \right] - Diff(t, x, y, mx, my)$$

Finally, the current pixel (x,y) in the interpolated picture could get for example the following value for the red, green and blue components:

$$Red(t+1/2, x, y) = \frac{\sum_{my=-My}^{my=My} \sum_{mx=-Mx}^{mx=Mx} C(mx, my) * (\text{Red}(t, x-mx, y-my) + \text{Red}(t+1, x+mx, y+my))}{2 * \sum_{my=-My}^{my=My} \sum_{mx=-Mx}^{mx=Mx} C(mx, my)}$$

$$Blue(t+1/2, x, y) = \frac{\sum_{my=-My}^{my=My} \sum_{mx=-Mx}^{mx=Mx} C(mx, my) * (\text{Blue}(t, x-mx, y-my) + \text{Blue}(t+1, x+mx, y+my))}{2 * \sum_{my=-My}^{my=My} \sum_{mx=-Mx}^{mx=Mx} C(mx, my)}$$

$$Green(t+1/2, x, y) = \frac{\sum_{my=-My}^{my=My} \sum_{mx=-Mx}^{mx=Mx} C(mx, my) * (\text{Green}(t, x-mx, y-my) + \text{Green}(t+1, x+mx, y+my))}{2 * \sum_{my=-My}^{my=My} \sum_{mx=-Mx}^{mx=Mx} C(mx, my)}$$

This motion compensation only requires one external frame memory. This frame memory can also be used for other purposes (e.g. for APL measurement in case of PDP).

The FIG. 2 is a block diagram of a possible circuit implementation for interpolating a motion compensated picture as described above. Input R, G, B video data, IN[9:0], is delayed of one frame by a frame memory 10. The input video data and the delayed video data are used to compute spatiotemporal averages in a block 11 and also to generate correlation coefficients by a generator 12. The correlation coefficients generator 12 is divided internally in at least two parts: a first part for computing block differences and a second part for generating correlation coefficients from these block differences. The spatiotemporal averages block 11 and the correlation coefficients generator 12 supply a Fuzzy Average block 13 with as many values as compensated motion values (2*Mx*2*My). The Fuzzy Average block 13 generates from these values one single value i.e. for each input pixel, only one output pixel values is generated.

To improve the performance or simplify the implementation, some pre- or post-processing like filtering, up or down sampling, can be done by a block 14 placed before the generator 12.

The invention claimed is:

1. Apparatus for interpolating a motion compensated picture from two source pictures, wherein, for determining the pixel value of each pixel with coordinates (x, y) of the motion compensated picture, it comprises:
    a first generator for computing, for each couple of motion values (mx, my), wherein the motion value mx belongs to a first range of motion values in the horizontal direction and the motion value my belongs to a second range of motion values in the vertical direction, a correlation coefficient representative of the correlation between a pixel block defined in a source picture called first source picture, around the pixel with coordinates (x−mx, y−my) and a pixel block defined in another source picture, called second source picture, around the pixel with coordinates (x+mx, y+my),
    a second generator for computing, for all couples of motion values (mx, my), the arithmetic mean values of the pixel value of the pixels with coordinates (x−mx, y−my) in the first source picture and the pixels with coordinates (x+mx, y+my) in the second source picture, and
    a fuzzy interpolation block for computing a value which is a function of the correlation coefficients computed by the first generator and the corresponding arithmetic mean values computed by the second generator.

2. Apparatus according to claim 1, wherein the fuzzy interpolation block computes the average of the arithmetic mean values computed by the second generator, each arithmetic mean value being weighted by the corresponding correlation coefficient computed by the first generator.

3. Apparatus according to claim 1, wherein a frame memory is provided for delaying input video data by one frame applied to the second generator and a block in front of the first generator.

4. Apparatus according to claim 1, wherein a frame memory is provided for storing one of the two source pictures applied to the first generator and applied to the second generator.

5. Apparatus according to claim 1, wherein a block in front of the first generator computes a block difference value between two pixel blocks associated with the considered couple of motion values (mx, my), and the first generator generates a correlation coefficient with is inversely proportional to said block difference value.

* * * * *

UNITED STATES PATENT AND TRADEMARK OFFICE
CERTIFICATE OF CORRECTION

PATENT NO. : 8,355,441 B2  Page 1 of 1
APPLICATION NO. : 11/791294
DATED : January 15, 2013
INVENTOR(S) : Thebault et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1514 days.

Signed and Sealed this
First Day of September, 2015

Michelle K. Lee
*Director of the United States Patent and Trademark Office*